United States Patent
Christy Jesuraj et al.

(10) Patent No.: US 11,010,217 B2
(45) Date of Patent: *May 18, 2021

(54) APPLICATION PROGRAMMING INTERFACES IN A MULTI-SERVER ENVIRONMENT

(71) Applicant: International Business Machines Corporation, Armonk, NY (US)

(72) Inventors: Leo Anthony Christy Jesuraj, Bowmanville (CA); Arthur L. De Magalhaes, Markham (CA); Felix Wong, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,140

(22) Filed: Feb. 3, 2020

(65) Prior Publication Data
US 2020/0174861 A1    Jun. 4, 2020

Related U.S. Application Data

(63) Continuation of application No. 15/808,385, filed on Nov. 9, 2017, now Pat. No. 10,592,318.

(51) Int. Cl.
    *G06F 9/54* (2006.01)
(52) U.S. Cl.
    CPC .................................. *G06F 9/547* (2013.01)
(58) Field of Classification Search
    None
    See application file for complete search history.

(56) References Cited

U.S. PATENT DOCUMENTS

| 10,592,318 B2 * | 3/2020 | Christy Jesuraj ......... G06F 9/54 |
| 2014/0089383 A1 | 3/2014 | Hong et al. |
| 2015/0095923 A1 | 4/2015 | Sarid |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Umut Onat
(74) *Attorney, Agent, or Firm* — Heslin Rothenberg Farley & Mesiti P.C.; Michael Petrocelli, Esq.

(57) ABSTRACT

A method, computer program product, and system includes a processor(s) obtaining application programming interface (API) records from one or more computing resources in a shared computing environment, which include individual API data from each computing resource, identifying, for each API record, a relative path to an endpoint of a respective application deployed on the computing resource. The processor(s) combines the individual API data into merged API data, which includes modifying the relative path of each API record to identify a specific computing resource in the path. The processor(s) generates an interface to display to a client a list of APIs identified in the merged API data. The processor(s) obtains a selection from the client, of a specific API, and invokes, a connection, via the interface and using one or more security artifacts, to the endpoint and the respective application of the specific API.

19 Claims, 7 Drawing Sheets

(56) References Cited

U.S. PATENT DOCUMENTS

| | | |
|---|---|---|
| 2015/0188779 A1 | 7/2015 | McCannet et al. |
| 2016/0253722 A1 | 9/2016 | Johnson et al. |
| 2016/0267153 A1 | 9/2016 | Witkop et al. |
| 2016/0294667 A1 | 10/2016 | Prabhakar et al. |
| 2016/0343041 A1 | 11/2016 | Pistotnik |
| 2017/0091848 A1 | 3/2017 | Pandey et al. |
| 2019/0138376 A1 | 5/2019 | Christy Jesuraj et al. |

OTHER PUBLICATIONS

Swagger Specification: Open API Specification (fka Swagger RESTful API Documentation Specification) Version 2.0, http://swagger.io/specification/, 81 pages, May 22, 2017.

List of IBM Patents or Patent Applications Treated as Related, Mar. 6, 2020, 2 pages.

\* cited by examiner

APPLICATION PROGRAMMING INTERFACES IN A MULTI-SERVER ENVIRONMENT

BACKGROUND

Representational state transfer (REST) or RESTful web services provide interoperability between computer systems on the Internet. REST-compliant web services enable a requestor to access and manipulate representations of web resources (e.g., applications) using a uniform and predefined set of stateless operations. A REST API uses generally HTTP requests to GET, PUT, POST and DELETE data and relies on a stateless, client-server, cacheable communications protocol. REST is an architecture style for designing networked applications and is therefore particularly prevalent in and relevant to, multi-server (multi-resource) computing environments. Specifically, because APIs provide interoperability between computer systems and allow for standardized connectivity, they are frequently utilized as endpoints on servers that enable other resources to access applications associated with the APIs that are deployed on the servers. For example, various REST APIs may be available from each of the individual servers in a multi-server environment, such as a cloud computing environment, providing endpoints to applications executing on the various servers.

A client accessing the APIs available from various servers in a multi-server environment, including but not limited to a cloud computing environment, cannot view, from a single point-of-entry, the APIs available from all the servers of the multi-server computing environment. Complicating the ability to access consolidated API information from a single point of entry is the fact that each individual server can be managed separately and APIs could be added, updated, and removed dynamically, due to applications being installed and uninstalled on individual servers. Additionally, a common API could be available on multiple servers and a client connecting to the multi-server environment would not know from which server to access the API.

SUMMARY

Shortcomings of the prior art are overcome and additional advantages are provided through the provision of a method for providing a centralized connection to applications on various servers in a shared computing environment. The method includes, for instance: obtaining, by one or more processors, of a first computing resource in a shared computing environment, application programming interface (API) records from one or more additional computing resources in the shared computing environment, the API records comprising individual API data from each computing resource, the individual API data identifying, for each API record in the individual API data, a relative path to an endpoint of a respective application deployed on the computing resource; combining, by the one or more processors, the individual API data from each computing resource, into merged API data, wherein the combining comprises modifying the relative path of each API record to identify a specific computing resource of the one or more additional computing resources, as the computing resource in the relative path; generating, by the one or more programs, an interface to display to a client a list of APIs identified in the merged API data; obtaining, by the one or more processors, from the client, through the interface, a selection of a specific API from the list; and based on obtaining, by the one or more processors, the selection, invoking, by the one or more processors, a connection, via the interface, to the endpoint and the respective application of the specific API.

Shortcomings of the prior art are overcome and additional advantages are provided through the provision of a computer program product for providing a centralized connection to applications on various servers in a shared computing environment. The computer program product comprises a storage medium readable by a processing circuit and storing instructions for execution by the processing circuit for performing a method. The method includes, for instance: obtaining, by one or more processors, of a first computing resource in a shared computing environment, application programming interface (API) records from one or more additional computing resources in the shared computing environment, the API records comprising individual API data from each computing resource, the individual API data identifying, for each API record in the individual API data, a relative path to an endpoint of a respective application deployed on the computing resource; combining, by the one or more processors, the individual API data from each computing resource, into merged API data, wherein the combining comprises modifying the relative path of each API record to identify a specific computing resource of the one or more additional computing resources, as the computing resource in the relative path; generating, by the one or more programs, an interface to display to a client a list of APIs identified in the merged API data; obtaining, by the one or more processors, from the client, through the interface, a selection of a specific API from the list; and based on obtaining, by the one or more processors, the selection, invoking, by the one or more processors, a connection, via the interface, to the endpoint and the respective application of the specific API.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
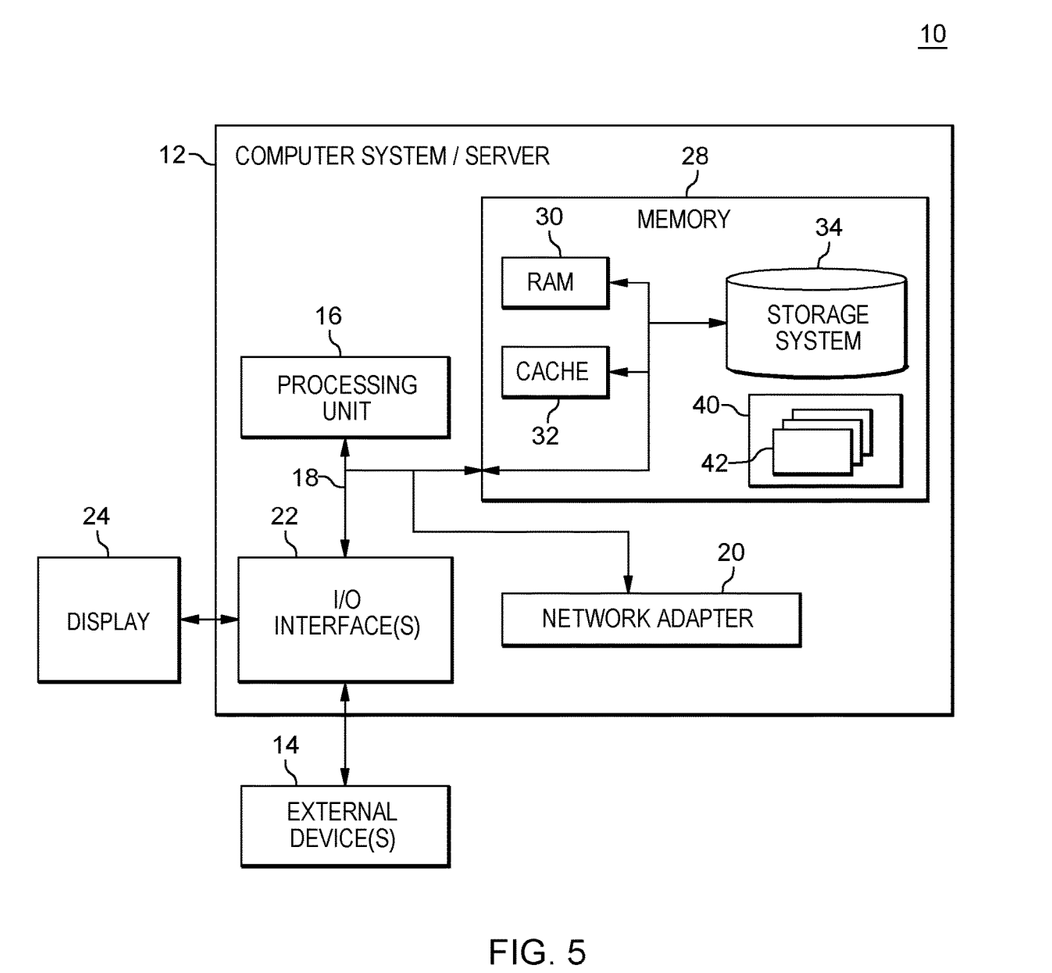
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computer system that enable one or more programs to invoke REST API endpoints in a multiple resource (e.g., multiple server) computing system from a central location. One or more programs in an embodiment of the present invention: 1) obtain REST API data from each server at a controller or other accessible computing resource; 2) modify the data obtained from all the servers to identify which APIs are available at which servers in the computing environment; 3) provide the consolidated modified data regarding API availability at a centralized location; and/or 4) provide a single interface for use in invoking the REST APIs, regardless of which server the desired API reside upon.

Regarding the first enumerated aspect, in some embodiments of the present invention, one or more programs identify and combine REST API data, including but not limited to, documentation, from multiple servers in a computing environment. In order to identify the APIs, one or more programs facilitate communication between servers and controllers in a computing environment. The one or more programs enable each server in the multiple server computing environment to aggregate API data related to the server (e.g., a combined API document) and publish the data by sending the data (e.g., the combined API document) to the one or more controllers in the computing environment. In some embodiments of the present invention the one or more programs that facilitate the publication of the API data for each server are provided by the one or more controllers. Thus, in some embodiments of the present invention, one or more programs aggregate REST API documentation from all applications on a single server and together with similar data from the remaining servers in the computing environment, generate an aggregate of all applications running in a collection of servers.

Regarding the second enumerated aspect, in some embodiments of the present invention, the one or more programs modify the data by: 1) modifying paths associated with the received API data (e.g., the combined API document); and 2) resolving conflicts in the data. By modifying the data received from various servers in the computing environment, the one or more programs effectively aggregate the varied REST APIs into a single unified model. First, for the data from each server, the one or more programs modify the paths associated with the received data so that the modified path includes a respective host identifier and a respective port identifier. These identifiers define unique path and associate the data with the server from which it originated. For example, in some embodiments of the present invention, the one or more programs modify the path by tagging the received API data with a unique server identifier that includes, for example, a host name, a user directory, and a server name that associated the API with the server. In some embodiments of the present invention, modifying the paths includes updating the API paths to have a different bound virtual and/or physical hosts. Second, the one or more programs handle/resolve conflicts (operations, definitions, etc.) in inconsistent data received from one or more sources. For example, the one or more programs may differentiate between the APIs from the same application running on multiple servers in generating the model that include an aggregation of the data. Resolving conflicts may also include the one or more programs filtering through the available APIs in order to generate consolidated data (e.g., a valid API document) containing the matching APIs along with the referenced definitions. Thus, the modified data identifies which APIs are available on which servers in the multiple server computing environment.

Regarding the third enumerated aspect, in some embodiments of the present invention, to enable access to consolidated REST API data at a central location, one or more programs store the API data from all the servers in the computing environment (e.g., the combined API documents of the servers) in a repository on the one or more controllers. Thus, embodiments of the present invention provide a single REST API document (or other consolidated data vehicle) for all REST APIs hosted on a single server or on a collection of servers.

Regarding the fourth enumerated aspect, in embodiments of the present invention, the one or more programs provide an interface (e.g., an Internet browser) which a user can utilize to connect to any available REST API on a server of the computing environment. As will be discussed in greater detail herein, this aspect is enabled in part because the one or more programs share security credentials, including secure sockets layer (SSL) certificates, from the API source, with other computing resources in the computing environment. Sharing the certificate or other credential enables a user to invoke the available APIs from inside a single interface (e.g., a browser). In embodiments of the present invention, the APIs provided by the interface are not static, rather, as will be described in greater detail herein, one or more program dynamically and automatically update the consolidated modified data when APIs change on the servers.

Aspects of embodiments of the present invention represent improvements to existing computing technology and are inextricably tied to computing. Embodiments of the present invention provide a solution to an issue that is specific to computing environments, an inability to gauge the availability of APIs for connection to applications executed on various servers, and an inability to connect to various APIs from a centralized location, where aggregate information regarding APIs is available.

Figure 1:
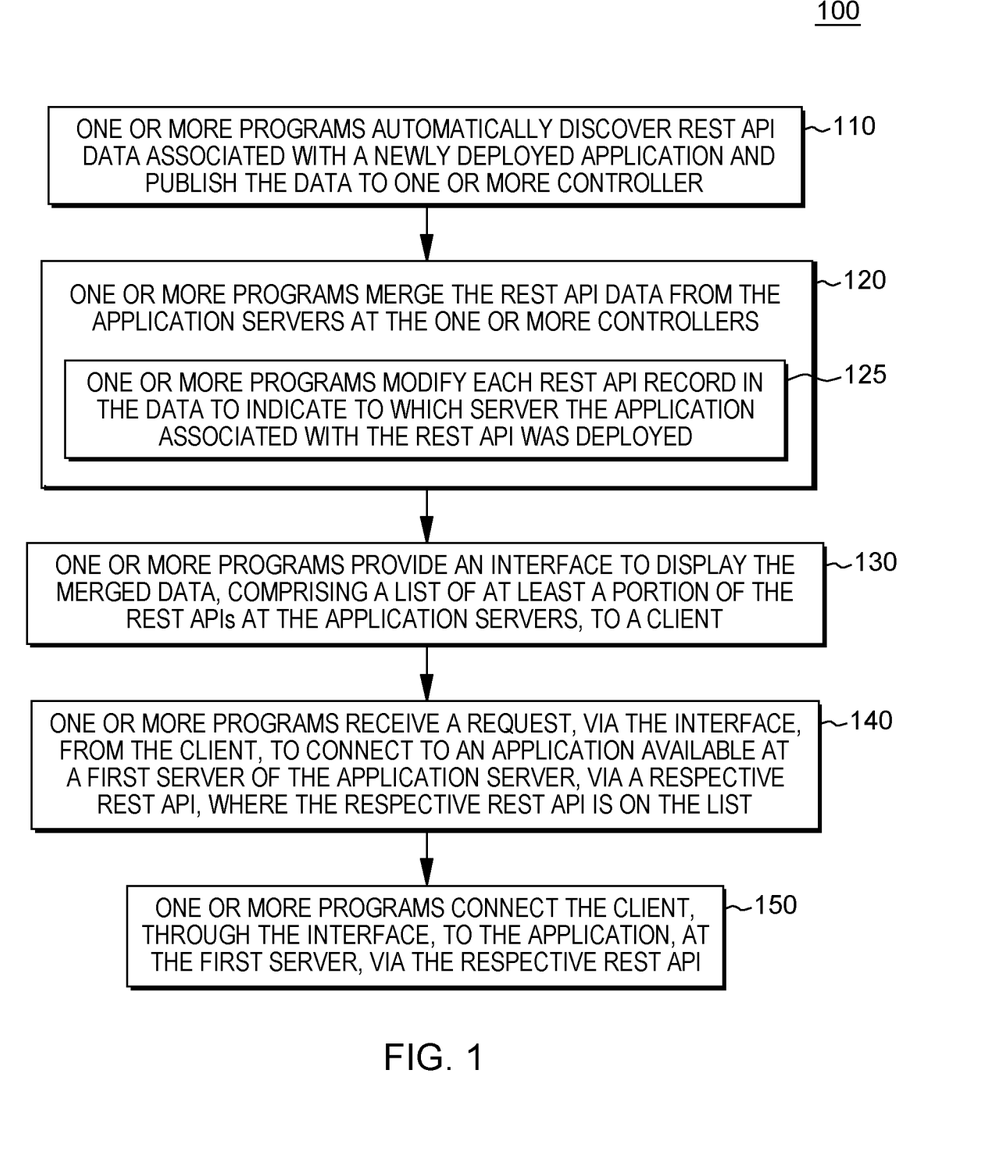
FIG. 1 is a workflow illustrating certain aspects of an embodiment of the present invention.

FIG. 1 is a workflow 100 that provides an overview of certain aspects of embodiments of the present invention. The workflow 100, for example, can be implemented in the computing environment 200 of FIG. 2, which will be discussed in greater detail. However, the workflow 100 will reference certain aspects of this computing environment 200, for illustrative purposes, which include a collection of application servers 210*a*-210*c*, one or more controllers 220, and a number of members 230.

Figure 2:
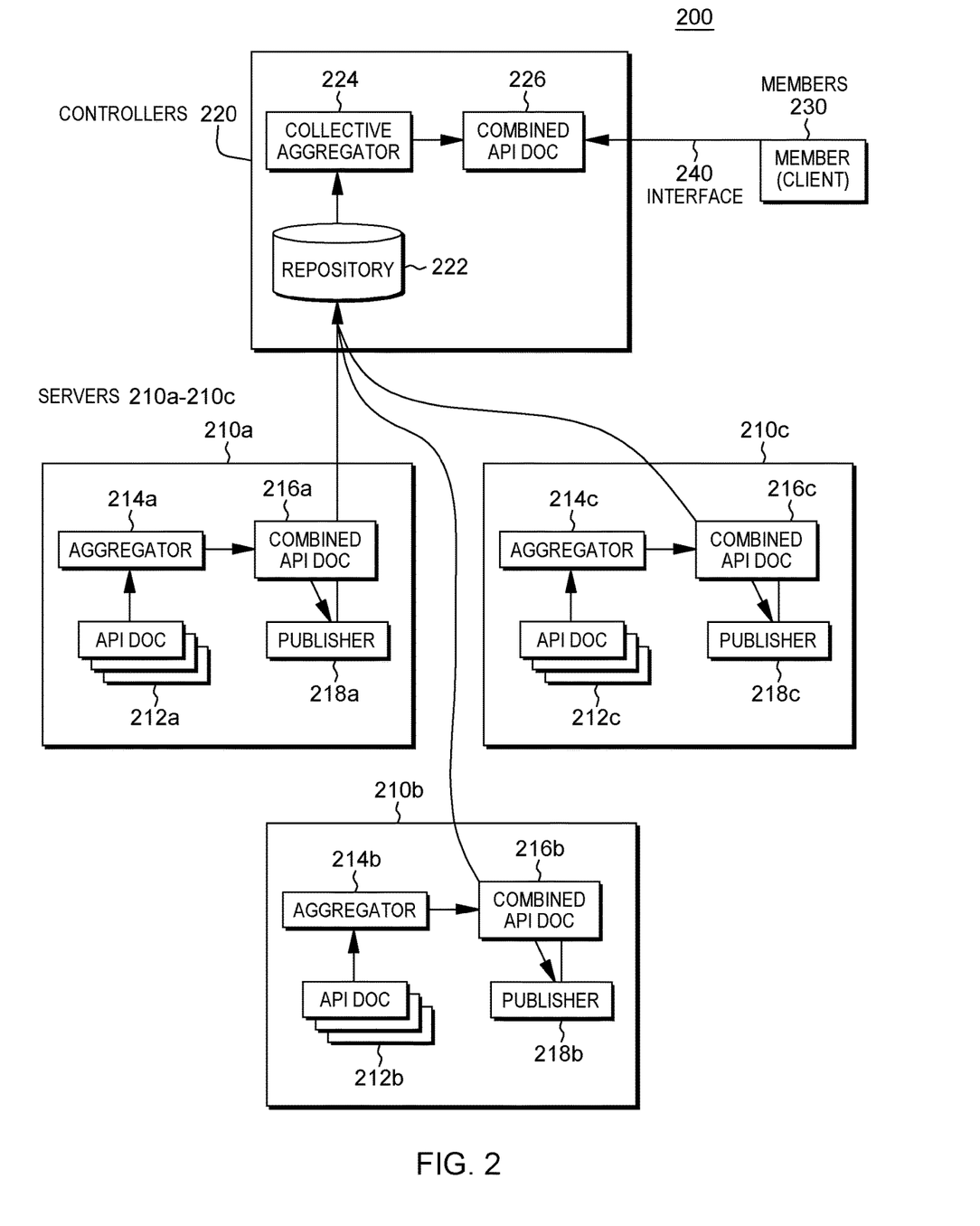
FIG. 2 is an illustration of various aspects of the present invention implemented in a technical environment.

Returning to FIG. 1, in some embodiments of the present invention, when an application is deployed in one or more of the application servers 210a-210c (FIG. 2), one or more programs executing on the application servers 210a-210c (FIG. 2) automatically discover REST API data (e.g., documentation, API Doc 212a-212c) associated with the application, and publish 218a-218c the data to the one or more controllers 220 (FIG. 2) (110). In some embodiments of the present invention, rather than publish the data of each REST API separately, upon deployment of the application, one or more programs executing on a server 210a-210c aggregates 214a-214c the API data (e.g., API document 212a-212c) to generate combined data (e.g., combined API document 216a-216c) at each individual server 210a-210c, which one or more programs on each server 210a-210c publish 218a-218c to one or more controller 220. Although FIG. 2 illustrates on or more programs on each server aggregating individual API data for their respective servers, in some embodiments of the present invention, one or more programs executed by the one or more controller 220 performs these aspects and/or provides program code that performs these aspects.

In some embodiments of the present invention, one or more programs executing on the one or more controllers merge the REST API data (e.g., documentation) from the application servers 210a-210c (120). As part of merging the data, the one or more programs modify each REST API record in the data to indicate to which server of the application servers 210a-210c (FIG. 2) the application associated with the REST API was deployed (125). For example, the one or more programs may modify the data by adding a host name a port number in front of a root of each API in the data. The one or more programs executing on the one or more controllers provide an interface that displays a list of a portion of the REST APIs of the application servers 210a-210c (130). The portion can be all the REST APIs, however, since the one or more programs may filter APIs to avoid duplication, the one or more programs may not display all the APIs. By connecting to the interface, each of the members 230 (FIG. 2) can view the merged data (REST API documentation of the entire collection of servers) and can utilize the interface to connect to each REST API. For example, the one or more programs provide an interface, where by connecting to the interface, a client views the merged data. The one or more programs receives a selection of a displayed rest API, via the interface, and based on receiving the selection, the interface configures a connection to the respective application for which the selected rest API as an endpoint.

Returning to FIG. 1, the one or more programs receive a request, via the interface, from a member of the members 230 to connect to an application (available at a first server of the application server 210a-120c, via a respective REST API, where the respective REST API is on the list (140). Based on receiving the request, the one or more programs connect the member, through the interface, to the application, at the first server, via the respective REST API (150). In some embodiments of the present invention, the interface is a web browser and/or a thin client, executed by the controller and accessible from the member (client)

To generate a comprehensive list of APIs for viewing, the one or more programs may filter the aggregated API data by server identifier and root and/or suppress common APIs from different servers. One reason that connecting to the interface enable a member to connect to any available REST API is that the interface obtains SSL certificates and performs Cross-Origin Resource Sharing (CORS) filtering to enable cross-domain requests from the interface to APIs.

As aforementioned, FIG. 2 illustrated aspects of a computing environment 200 into which aspects of embodiments of the present invention may be implemented. As discussed in the workflow 100 of FIG. 1, this example computing environment program code executing at the servers 210a-210c aggregates REST APIs for its individual server and publishes the combined data from the server to the one or more controllers 220. In order to illustrate the aggregation and publication functionality on the servers 210a-210c in some embodiments of the present invention (as in some embodiments one or more of these aspects are performed by program code executed by one or more controllers 220), individual program modules are designated in FIG. 2. The modular architecture is merely one example and is provided for clarity, not as a technical limitation. Thus, as illustrated in FIG. 2, an aggregator 214a-214c program discovers API information (e.g., individual API documents 212a-212c) and combines the individual data related to each REST API of an application deployed in that server 210a-210c. A publisher 218a-218c program publishes the combined API data (e.g., combined API documents 216a-216c) to the one or more controllers 220. In the illustrated embodiment, the publisher 218a-218c programs publishes the combined API documents 216a-216c to a repository 222 on the one or more controllers 220. In some embodiments of the present invention, in order to publish the API information of the individual servers 210a-210c to the one or more controllers 220, the one or more programs (e.g., the publishers 218a-218c) may utilize objects provided by the one or more controllers 220. For example one or more programs executing on the one or more controllers 220 may provide an object (e.g., a Java® object, Java is a trademark of Oracle and/or its affiliates), such as a managed bean (MBean), to the publishers 218a-218c, which represent a manageable resource on the one or more controller 220, including but not limited to, an application, a service, a component, or a device.

In some embodiments of the present invention, a collective aggregator 224 program executing on the one or more controllers 220 obtains the combined API documents 216a-216c from the repository 222. The collective aggregator 224 program aggregates the combined API documents 216a-216c from all the application servers 210a-210c (e.g., into combined API document 226). When aggregating the combined API documents 216a-216c, the collective aggregator 224 program modifies each REST API record in the data to indicate to which server (of the application servers 210a-210c in the computing environment 200) the application associated with the REST API was deployed. Thus, the combined API data (e.g., combined API document 226) on the one or more controllers 226 includes the locations of the REST APIs and their respective applications in the computing environment 200.

In some embodiments of the present invention, one or more programs on the one or more controllers 220 generate an interface 240 to which members 230 can connect in order to connect to endpoints of the REST APIs on the applications servers 210a-210c, e.g., to access the respective applications. The interface 240 displays a list of REST APIs, and a connected member 230 selected a REST API in the interface and the one or more programs connect the member 230 to the REST API on its server of origin. For example, the one or more programs may receive a request via the interface 240 for a REST API on a first server 210a. Based on receiving this request, the one or more programs create a connection from the member 230 to the requested REST API on the first server 210a, through the interface 200. In some embodiments of the present invention, the one or more programs share security credentials, including SSL certificates, from the API source, with other computing resource in the computing environment, to enable a member 230 to invoke the REST APIs from the a single interface 240. In environments such as computing environment 200, which includes a collection of servers 210a-210c, viewing the entire set of API definitions provided by all servers 210a-210c in a central place such as a controller 230, is much more convenient and feasible (for large topologies) than viewing the API definitions from the individual servers 210a-210c. One or more programs may generate the interface 240 utilizing components of existing user interface (UI) frameworks, including but not limited to, the Swagger framework. The Swagger software framework includes components (tools) that enabled developers to design, build, document, and consume RESTful Web services.

In some embodiments of the present invention, when a new server (e.g., server 201a) is added to the computing environment 200, the aggregator 214a on the new sever 201a will send the API data, e.g., in a combined API document 216a to the publisher 218a. Additionally, if one or more programs in a server 210a-210c detects a change, the one or more programs (e.g., the publisher 218a) will send updated API information to the one or more controllers 220. For example, the publisher 218a may utilize an object provided by the one or more controllers 220 to publish the API information (e.g., API document), such as an MBean.

Upon receipt of updated API information (including information from a new resource), in the repository 222, of the one or more controllers, 220, one or more programs obtain (e.g., a collective aggregator 224) the changes and combine this data with the API data of the other servers 210b-210c to create a new aggregated document (e.g., a combined API document 226). In some embodiments of the present invention, changes to the API data repository 222 are obtained by a listener program executing on the one or more controllers 220. In some embodiments of the present invention, the one or more programs combine the API data by combining individual API documents 216a-216c into a single combined API document 226, which one or more programs executed by the one or more controllers 220 update when information in the repository 222 is updated. Any updates to the API information can be viewed, including in real-time, through the interface 240. In displaying the API information in the interface, the one or more programs may filter the API information, for example, displaying only unique API definitions in the interface 240.

Returning, the FIG. 1, as aforementioned, in embodiments of the present invention, one or more programs modify each REST API record of the (collected) API data to indicate to which server the application associated with the REST API was deployed (125). By modifying the records, the one or more programs differentiate conflicting API endpoints such that within the collective API document (e.g., FIG. 2, 226), an API endpoint is identified by the path, relative to the host name and all paths, are unique. Merging API data, such as API documents (e.g., FIG. 2, 216a-216c). In a shared computing environment, two different applications, deployed on different servers, may use the same path in different ways. However, when merging API data (e.g., documents), identical paths (because they are relative) create issues. In embodiments of the present invention, one or more programs resolve this issue by adding the host and port to each path, making the conflicting paths unique.

Figure 3:
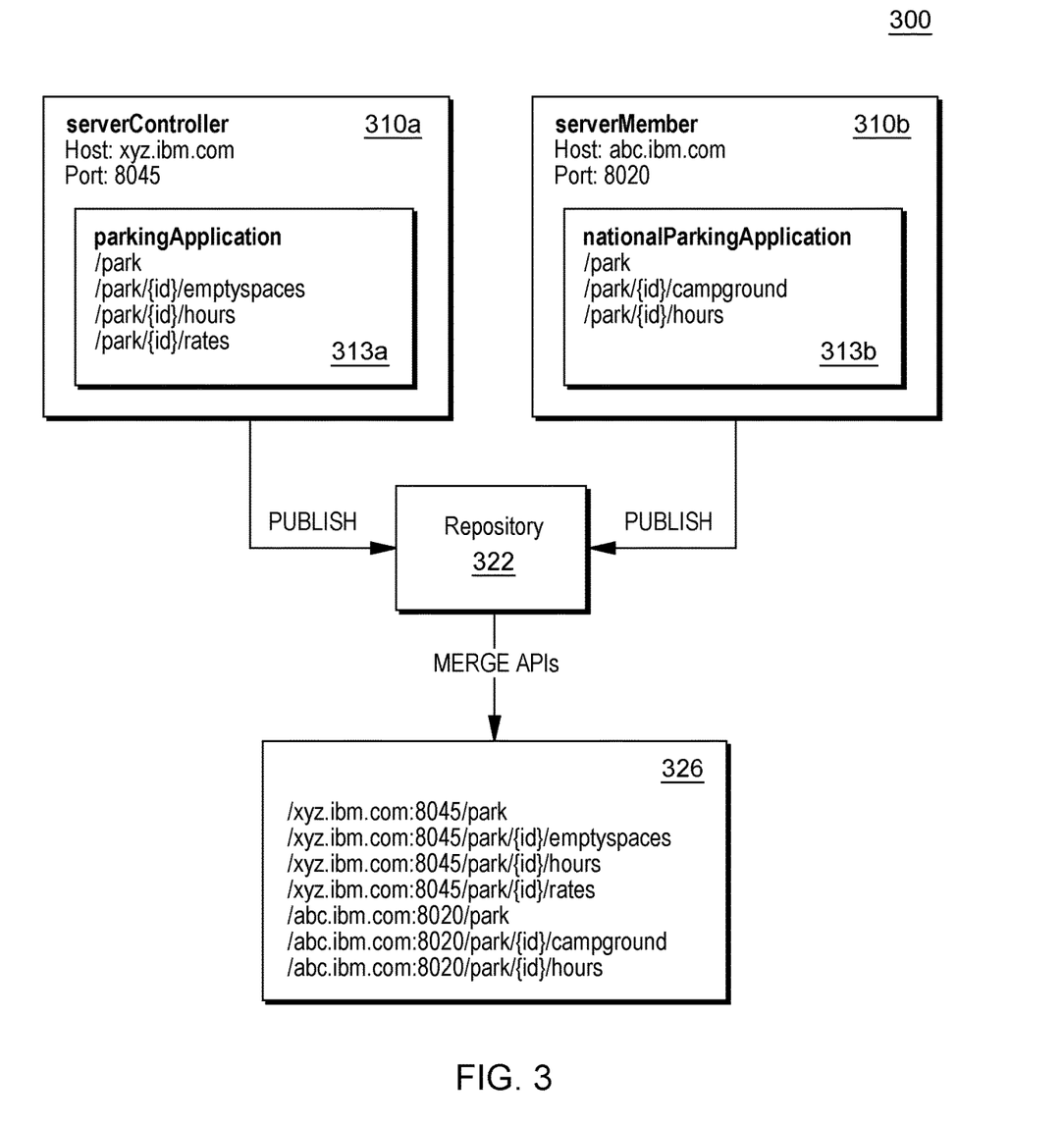
FIG. 3 is an illustration of various aspects of the present invention implemented in a technical environment.

FIG. 3 illustrates how one or more programs differentiate between applications with the same paths so that the combined API information available through an interface provides REST APIs that are each accessible via a unique path. FIG. 3 depicts two servers 310a-310b that host different applications 313a-313b, which share the same path. In this non-limiting example, a first server 310a hosts a first application 313a, while a second server 310b, hosts a second application 313b. In this example, the first application 313a, parkingApplication, deployed on a first server 310a, server-Controller, is related to car parking lots. A second application 313b, nationalParkingApplication, is deployed on a second server 310b, serverMember, and is related to national parks. Because both the first application 313a and the second application 313b use "park" as the root, they have two paths that are identical, /park and /park/{id}/hours. Thus, this API information cannot be consolidated, as is, into combined API file, such as a combined API document (e.g., FIG. 2, 226) because the overlap of the definitions would not enable connection to the correct destination through a single interface (e.g., FIG. 2, 240).

As illustrated in FIG. 3, when the API data from each server in published to a repository 322, one or more programs merge the API data, which includes adding the host and port to each API path. In order to avoid path duplication and to enable members (e.g., FIG. 2, 230) to connect, through the single interface (e.g., FIG. 2, 240) to REST APIs at the servers upon which the respective applications are deployed, one or more programs, in an embodiment of the present invention, when combining the API data from the servers, adds the host and port to each path. The host of the first server 310a is xyz.ibm.com, and the port utilized by the first application 310b on the first server 310a, is 8045. The host of the second server 310a is abc.ibm.com, and the port utilized by the second application 310b on the second server 310a, is 8020.

By adding the host and the port to each path, the one or more programs make the API paths unique. By modifying the paths, one or more programs in an embodiment of the present invention provide users with the functionality to invoke the endpoints, available from different servers (e.g., FIG. 2, 210a-210c) from a central place, utilizing a single interface (e.g., FIG. 2, 240). The one or more programs tag paths and operations with a unique server identifier (e.g., hostname, user directory, server name) to enable users viewing APIs through an interface (e.g., FIG. 2, 240), generated by program code on one or more controllers (e.g., FIG. 2, 230), to determine which APIs are available on which servers.

FIG. 3 illustrates a list of 326 merged APIs (e.g., combined API document 226), which the one or more programs display in an interface (e.g., FIG. 2, 240), from which a user may select one or more of the APIs, to access the endpoints. The hosts and ports of the first server 310a and the second server 310b have been added to the paths. Thus, the list 326 of APIs includes only unique entries.

Returning to FIG. 1, in addition to generating and applying unique API paths, in order for one or more programs to connect a client (e.g., FIG. 2, member 230), through the interface (e.g., FIG. 2, 240), to the application, at the first server (e.g., FIG. 2, 210a), via the respective REST API (e.g., FIG. 2, 212a) (150), in some embodiments of the present invention, the one or more programs perform a remote browser-to-browser invocation between the interface (e.g., FIG. 2, 240) running on one or more controllers (e.g., FIG. 2, 220), which can also be understood as a collective controller, and a target RESTful endpoint in a collective member (e.g., FIG. 2, 230). As discussed earlier, in order to form this connection, the one or more programs obtain artifacts, from the servers in the computing environment, to which connections will be formed.

Figure 4:
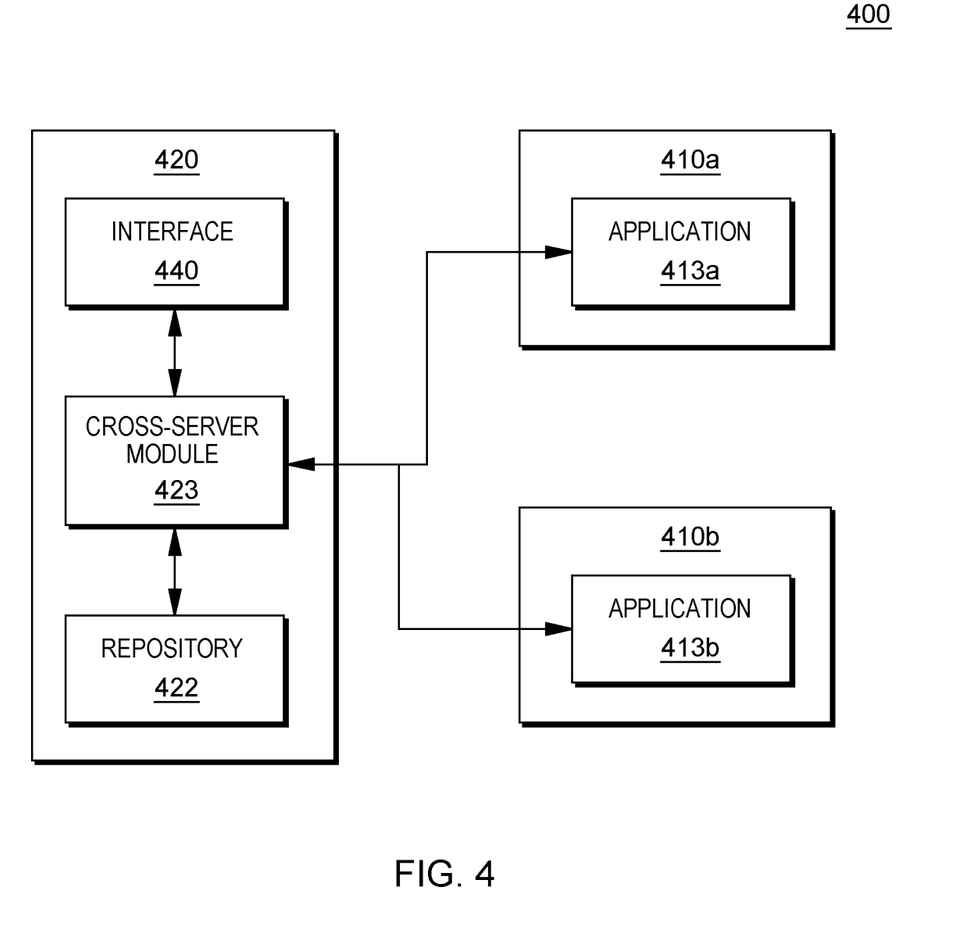
FIG. 4 is an illustration of various aspects of the present invention implemented in a technical environment.

FIG. 4 depicts an example of a technical architecture 400 that depicts portions of the one or more programs (executed by one or more controllers), that generate an interface that enables members to connect to endpoints, utilizing REST APIs (FIG. 1, 150). For illustrative purposes only, portions of this functionality are separated into modules and in the illustrated embodiment. The pictured modules are not meant to imply any limitations in combining and/or separating functionality into various programs and/or processes, and are separated, as illustrated, for clarity, only. Specifically, in FIG. 4, one or more programs executing on a controller 420 that obtain artifacts, from applications 413a-413b executing on servers 410a-410b in the computing environment 400, are depicted as being part of a cross-server module 423.

In some embodiments of the present invention, one or more programs in the cross-server module 423 obtain artifacts to form a remote (e.g., browser-to-browser) invocation between the interface 440 and RESTful endpoints on the servers 410a-410b. To form a remote invocation, the one or more programs may include an SSL bridge and a CORS filter.

The one or more programs in the cross-server module 423 comprising the SSL bridge obtain an SSL certificate for a target server 410a-410b, and utilize the certificate when connecting to the server 410a-410b (e.g., via an HTTPS connection). The one or more programs may store certificates that it obtains, for future use, in a repository 422. In some embodiments of the present invention, when a server 410a-410b joins a shared computing environment, the one or more programs may obtain connection artifacts, such as certificates, in the repository 422, contemporaneously with obtaining the API data from the new server.

In some embodiments of the present invention, when forming the remote connection between the endpoint and a client, the one or more programs in the cross-server module 423 utilize a CORS filter. The one or more programs add cross-origin headers into the HTTPS connection's response so that the interface 440 (e.g., a browser running the Swagger UI) does not block the request. One or more programs executing on the servers 410a-410b may configure the CORS attributes used by the filter and store the attribute configurations in the collective repository 422.

Embodiments of the present invention include a computer-implemented method, a system, and a computer program product in which one or more programs executing on one or more processors on a first computing resource in a shared computing environment obtain application programming interface (API) records from one or more additional computing resources in the shared computing environment, the API records including individual API data from each computing resource, the individual API data identifying, for each API record in the individual API data, a relative path to an endpoint of a respective application deployed on the computing resource. The one or more programs combine the individual API data from each computing resource, into merged API data, where the combining includes modifying the relative path of each API record to identify a specific computing resource of the one or more additional computing resources, as the computing resource in the relative path. The one or more programs generate an interface to display to a client a list of APIs identified in the merged API data. The one or more programs obtain, from the client, through the interface, a selection of a specific API from the list. Based on obtaining the selection, the one or more programs invoke a connection, via the interface, to the endpoint and the respective application of the specific API.

In some embodiments of the present invention the one or more programs also provide an object to the one or more additional computing resources. In these embodiments, the one or more programs obtain the API records via utilization of the object by the one or more additional computing resources.

In some embodiments of the present invention, the individual API data from each computing resource of the additional one or more computing resources includes a consolidated API document comprising APIs representing applications deployed on the computing resource.

In some embodiments of the present invention, the one or more programs obtain, from each computing resource of the additional one or more computing resources, security artifacts associated with the applications deployed on the computing resource.

In some embodiments of the present invention, the respective application is associated with a first artifact of the security artifacts. In these embodiments, the one or more programs invoking includes the one or more programs utilizing the first artifact to invoke the connection to the endpoint and the respective application. In some embodiments of the present invention, the first artifact is selected from the group consisting of: a secure sockets layer (SSL) certificate and a Cross-Origin Resource Sharing (CORS) filter.

In some embodiments of the present invention, the API records each represent a Representational State Transfer (REST) API.

In some embodiments of the present invention, the one or more programs also obtain individual API data from a new computing resource in the shared computing environment, the individual API data from a new computing resource identifying, for each API record in the individual API data from a new computing resource, a relative path to an endpoint of a respective application deployed on the new computing resource. The one or more programs update the merged API data by combining the individual API data from the new computing resource with the merged API data, wherein the combining comprises modifying the relative path of each API record in the individual API from the new computing resource to identify the new computing resource as the computing resource in the relative path in each API record in the individual API from the new computing resource. The one or more programs update the interface to display to the client an updated list of APIs, wherein the updated list comprises APIs identified in the updated merged API data. Based on the one or more programs obtain, from the client, through the interface, a selection of a second specific API from the updated list, invoking, by the one or more processors, a new connection, via the interface, to the endpoint and the respective application of the second specific API.

In some embodiments of the present invention combining the individual API data from each computing resource into merged API data also includes the one or more programs identifying at least one duplicate records in the merged API data. The one or more programs remove the at least one duplicate API record in the merged API data.

In some embodiments of the present invention, the one or more programs generating the interface includes providing a filter functionality, where the functionality enables the client to filter the list of APIs by computing resource of the additional computing resources.

In some embodiments of the present invention, the first computing resource comprises includes one or more controllers.

In some embodiments of the present invention, the one or more additional computing resources include one or more application servers.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resources, including the one or more controllers 220 (FIG. 2), the servers 210a-210c (FIG. 2), the one or more members 230 (FIG. 2), the servers 210a-210c (FIG. 2), the servers 310a-310b (FIG. 3), the servers, 410a-410b (FIG. 4), and the controller 420 (FIG. 4) can all be understood as one or more cloud computing nodes 10 (FIG. 5) and if not examples of a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
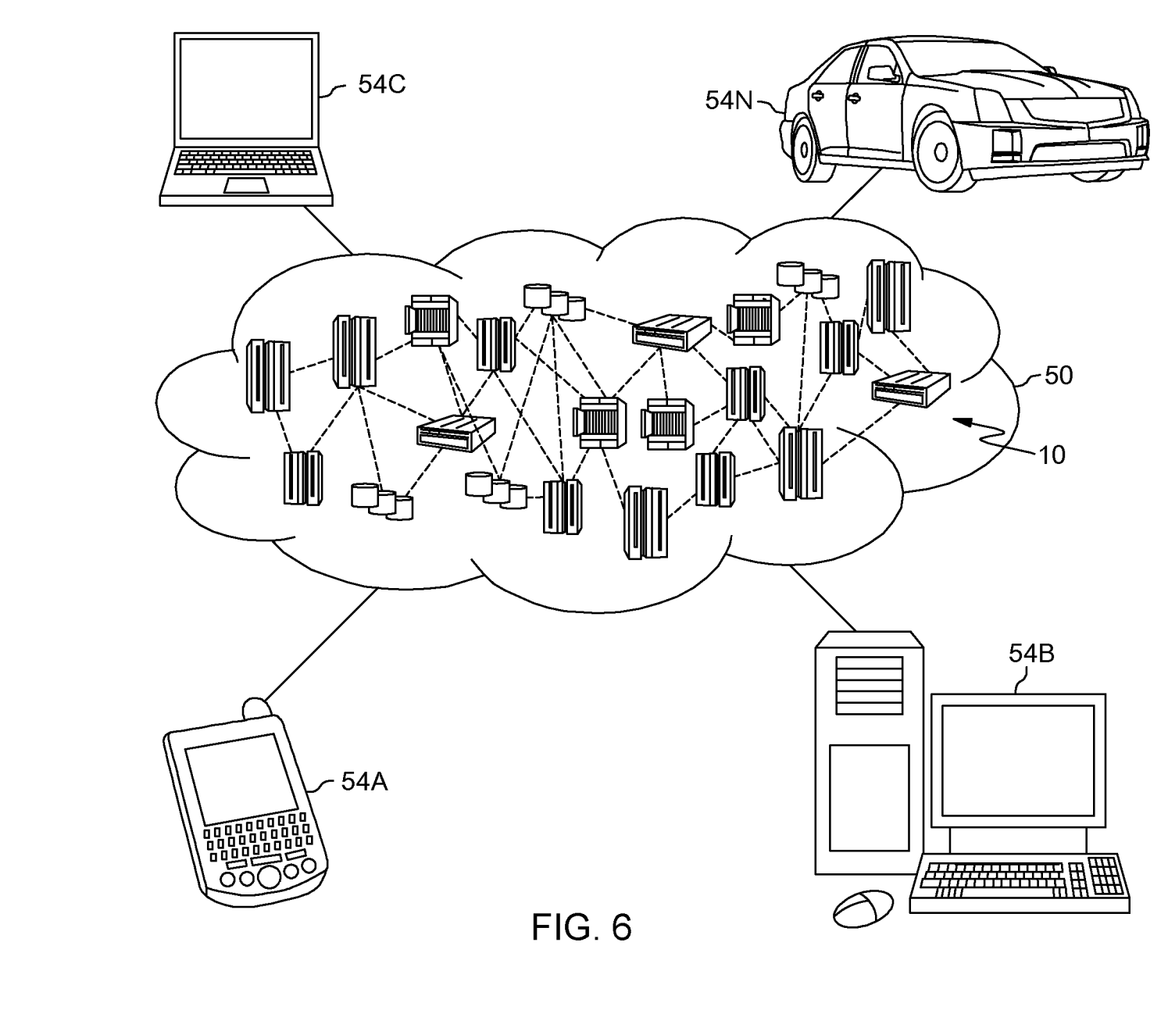
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
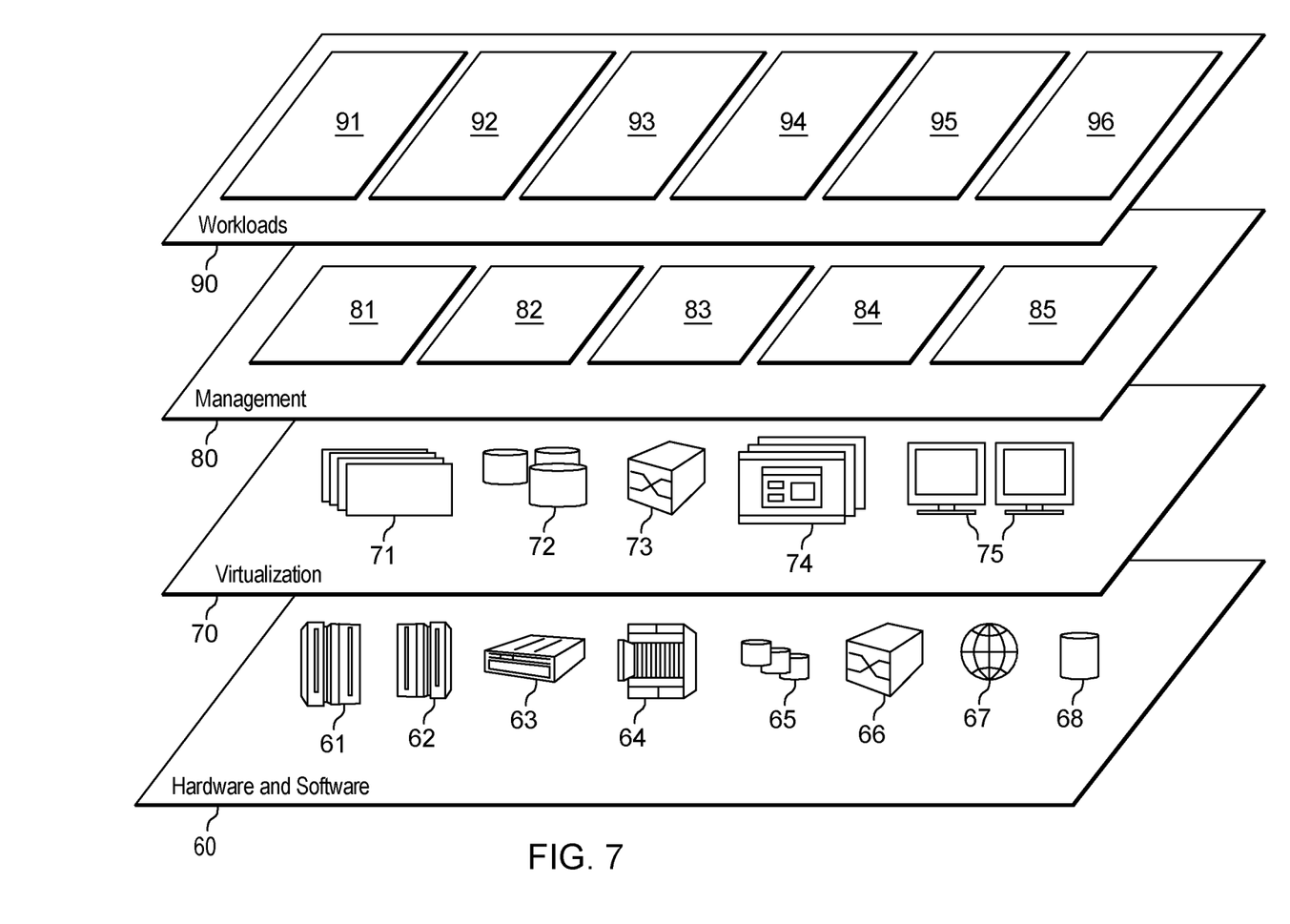
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a common interface to endpoints on various computing resources 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, of a first computing resource in a shared computing environment, interface records from one or more additional computing resources in the shared computing environment, the interface records comprising individual interface data from each computing resource, the individual interface data identifying, for each interface record in the individual interface data, a relative path to an endpoint of a respective application deployed on the computing resource; and
   combining, by the one or more processors, the individual interface data from each computing resource, into merged interface data, wherein the combining comprises modifying the relative path of each interface record to identify a specific computing resource of the one or more additional computing resources, as the computing resource in the relative path, wherein the modifying comprises:
   tagging the individual interface data from each computing resources with a unique server identifier associating the interface with a server of origin for the interface; and
   resolving conflicts in the individual interface data from each computing resource, wherein the conflicts comprise differentiating between more than one interface from a common application, wherein the merged interface data comprises an aggregation of data from the more than one interface.

2. The computer-implemented method of claim 1, further comprising:
   generating, by the one or more programs, a graphical interface to display to a client a list of interfaces identified in the merged interface data.

3. The computer-implemented method of claim 2, further comprising:
   obtaining, by the one or more processors, from the client, through the graphical interface, a selection of a specific interface from the list.

4. The computer-implemented method of claim 3, further comprising:
   based on obtaining, by the one or more processors, the selection, invoking, by the one or more processors, a connection, via the graphical interface, to the endpoint and the respective application of the specific interface.

5. The computer-implemented method of claim 4, further comprising:
   obtaining, by one or more processors, individual interface data from a new computing resource in the shared computing environment, the individual interface data from a new computing resource identifying, for each interface record in the individual interface data from a new computing resource, a relative path to an endpoint of a respective application deployed on the new computing resource;
   updating, by the one or more processors, the merged interface data by combining the individual interface data from the new computing resource with the merged interface data, wherein the combining comprises modifying the relative path of each interface record in the individual interface from the new computing resource to identify the new computing resource as the computing resource in the relative path in each interface record in the individual interface from the new computing resource;
   updating, by the one or more processors, the interface to display to the client an updated list of interfaces, wherein the updated list comprises interfaces identified in the updated merged interface data; and
   based on obtaining, by the one or more processors, from the client, through the interface, a selection of a second specific interface from the updated list, invoking, by the one or more processors, a new connection, via the interface, to the endpoint and the respective application of the second specific interface.

6. The computer-implemented method of claim 2, wherein generating the interface comprises providing a filter functionality, wherein the functionality enables the client to filter the list of interfaces by computing resource of the additional computing resources.

7. The computer-implemented method of claim 1, further comprising:
   providing, by the one or more processors, an object to the one or more additional computing resources, and wherein obtaining the interface records is via utilization of the object by the one or more additional computing resources.

8. The computer-implemented method of claim 7, wherein the unique server identifier comprises a host name, a user directory, and the server name of the server of origin for the interface, the method further comprising:
   obtaining, by the one or more processors, from each computing resource of the additional one or more computing resources, security artifacts associated with the applications deployed on the computing resource.

9. The computer-implemented method of claim 8, wherein the respective application is associated with a first artifact of the security artifacts, and wherein the invoking comprises utilizing the first artifact to invoke the connection to the endpoint and the respective application.

10. The computer-implemented method of claim 9, wherein the first artifact is selected from the group consisting of: a secure sockets layer (SSL) certificate and a Cross-Origin Resource Sharing (CORS) filter.

11. The computer-implemented method of claim 1, wherein the individual interface data from each computing resource of the additional one or more computing resources comprises a consolidated interface document comprising interfaces representing applications deployed on the computing resource.

12. The computer-implemented method of claim 1, wherein the interface records each represent a Representational State Transfer (REST) interface.

13. The computer-implemented method of claim 1, wherein combining the individual interface data from each computing resource into merged interface data further comprises:
   identifying, by the one or more processors, at least one duplicate records in the merged interface data; and
   removing, by the one or more programs, the at least one duplicate interface record in the merged interface data.

14. The computer-implemented method of claim 1, wherein the first computing resource comprises one or more controllers.

15. The computer-implemented method of claim 1, wherein the one or more additional computing resources comprise one or more application servers.

16. A computer program product comprising:
   a computer readable storage medium readable by one or more processors and storing instructions for execution by the one or more processors for performing a method comprising:
   obtaining, by the one or more processors, of a first computing resource in a shared computing environment, application programming interface (interface) records from one or more additional computing resources in the shared computing environment, the interface records comprising individual interface data from each computing resource, the individual interface data identifying, for each interface record in the individual interface data, a relative path to an endpoint of a respective application deployed on the computing resource; and
   combining, by the one or more processors, the individual interface data from each computing resource, into merged interface data, wherein the combining comprises modifying the relative path of each interface record to identify a specific computing resource of the one or more additional computing resources, as the computing resource in the relative path wherein the modifying comprises:
   tagging the individual interface data from each computing resources with a unique server identifier associating the interface with a server of origin for the interface; and
   resolving conflicts in the individual interface data from each computing resource, wherein the conflicts comprise differentiating between more than one interface from a common application, wherein the merged interface data comprises an aggregation of data from the more than one interface.

17. The computer program product of claim 16, the method further comprising:
   generating, by the one or more programs, an interface to display to a client a list of interfaces identified in the merged interface data.

18. The computer program product of claim 17, the method further comprising:
   obtaining, by the one or more processors, from the client, through the interface, a selection of a specific interface from the list.

19. A system comprising:
   a memory;
   one or more processors in communication with the memory; and
   program instructions executable by the one or more processors via the memory to perform a method, the method comprising:
   obtaining, by the one or more processors, of a first computing resource in a shared computing environment, application programming interface (interface) records from one or more additional computing resources in the shared computing environment, the interface records comprising individual interface data from each computing resource, the individual interface data identifying, for each interface record in the individual interface data, a relative path to an endpoint of a respective application deployed on the computing resource; and
   combining, by the one or more processors, the individual interface data from each computing resource, into merged interface data, wherein the combining comprises modifying the relative path of each interface record to identify a specific computing resource of the one or more additional computing resources, as the computing resource in the relative path wherein the modifying comprises:
   tagging the individual interface data from each computing resources with a unique server identifier associating the interface with a server of origin for the interface; and
   resolving conflicts in the individual interface data from each computing resource, wherein the conflicts comprise differentiating between more than one interface from a common application, wherein the merged interface data comprises an aggregation of data from the more than one interface.

* * * * *